US010771948B2

(12) United States Patent
Haubs

(10) Patent No.: US 10,771,948 B2
(45) Date of Patent: Sep. 8, 2020

(54) SYSTEM AND METHOD FOR MONITORING A SPATIAL POSITION OF A MOBILE TRANSMITTER, MAN-OVER-BOARD DETECTION SYSTEM

(71) Applicant: Rohde & Schwarz GmbH & Co. KG, Munich (DE)

(72) Inventor: Matthias Haubs, Neubiberg (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days.

(21) Appl. No.: 16/207,880

(22) Filed: Dec. 3, 2018

(65) Prior Publication Data
US 2020/0178057 A1   Jun. 4, 2020

(51) Int. Cl.
*H04W 64/00* (2009.01)
*H04W 4/90* (2018.01)
*H04W 4/02* (2018.01)
*H04B 17/318* (2015.01)
*G08B 25/00* (2006.01)
*H04W 24/08* (2009.01)
*B63C 9/00* (2006.01)

(52) U.S. Cl.
CPC ............ *H04W 4/90* (2018.02); *B63C 9/0005* (2013.01); *G08B 25/009* (2013.01); *H04B 17/318* (2015.01); *H04W 4/027* (2013.01); *H04W 24/08* (2013.01)

(58) Field of Classification Search
None
See application file for complete search history.

(56) References Cited

U.S. PATENT DOCUMENTS

| 5,021,765 | A  | * | 6/1991 | Morgan | ............... B63C 9/0005 340/539.23 |
|---|---|---|---|---|---|
| 5,461,365 | A  |   | 10/1995 | Schlager et al. | |
| 7,176,832 | B2 |   | 2/2007 | Bruno et al. | |
| 7,394,384 | B2 |   | 7/2008 | Rainczuk et al. | |
| 7,642,919 | B2 |   | 1/2010 | Leal et al. | |
| 8,970,382 | B2 |   | 3/2015 | Bermudez Pestonit et al. | |
| 10,054,663 | B2 |  | 8/2018 | Katz | |
| 10,373,469 | B2 |  | 8/2019 | Fernandez et al. | |
| 2002/0021231 | A1 | | 2/2002 | Schlager et al. | |
| 2002/0052159 | A1 | | 5/2002 | Eguchi | |
| 2002/0158795 | A1 | | 10/2002 | Hansmann et al. | |

(Continued)

FOREIGN PATENT DOCUMENTS

| CN | 201302609 Y | 9/2009 |
|---|---|---|
| CN | 101661094 A | 3/2010 |

(Continued)

*Primary Examiner* — Suhail Khan
(74) *Attorney, Agent, or Firm* — Westman, Champlin & Koehler, P.A.

(57) ABSTRACT

A system and method for monitoring a spatial position of a mobile transmitter is provided. In particular, the mobile transmitter may be attached to or included in an object of interest. By analyzing the signal strengths of radio frequency signals emitted by the transmitter, a spatial position of the mobile transmitter can be determined, and it is possible to detect whether or not the spatial position of the mobile transmitter is outside an allowable area. By applying the monitoring of the spatial position to a radio frequency system on a vessel, a reliable man-over-board detection can be achieved.

27 Claims, 3 Drawing Sheets

(56) References Cited

U.S. PATENT DOCUMENTS

| | | |
|---|---|---|
| 2003/0107516 A1 | 6/2003 | Hansmann et al. |
| 2005/0040987 A1 | 2/2005 | Bruno et al. |
| 2005/0248454 A1* | 11/2005 | Hanson ............... G06Q 10/087 340/539.26 |
| 2008/0062816 A1 | 3/2008 | Leal et al. |
| 2009/0167536 A1 | 7/2009 | Clark et al. |
| 2011/0080285 A1* | 4/2011 | Howson ................ G01S 3/40 340/540 |
| 2012/0034592 A1 | 2/2012 | Santiago Fontaiña |
| 2012/0188103 A1 | 7/2012 | Bermudez Pestonit et al. |
| 2015/0373521 A1* | 12/2015 | Olesen .................. H04W 4/90 455/404.2 |
| 2016/0340006 A1 | 11/2016 | Tang |
| 2018/0082565 A1* | 3/2018 | Braiman ........... G08B 21/0272 |
| 2018/0095156 A1 | 4/2018 | Katz |
| 2018/0172828 A1 | 6/2018 | Moody et al. |
| 2018/0174422 A1 | 6/2018 | Fernandez et al. |
| 2019/0287740 A1 | 9/2019 | Barker et al. |

FOREIGN PATENT DOCUMENTS

| | | |
|---|---|---|
| CN | 101723064 A | 6/2010 |
| CN | 204775915 U | 11/2015 |
| CN | 204775916 U | 11/2015 |
| CN | 205168848 U | 4/2016 |
| CN | 105691565 A | 6/2016 |
| CN | 106697226 A | 5/2017 |
| CN | 107416148 A | 12/2017 |
| CN | 207208405 U | 4/2018 |
| CN | 108100187 A | 6/2018 |
| CN | 108202848 A | 6/2018 |
| CN | 108298044 A | 7/2018 |
| CN | 108360400 A | 8/2018 |
| CN | 108545160 A | 9/2018 |
| CN | 207826501 U | 9/2018 |
| CN | 108622336 A | 10/2018 |
| CN | 207955997 U | 10/2018 |
| DE | 4311473 A1 | 10/1994 |
| DE | 102015011630 A1 | 3/2017 |
| EP | 0360671 A1 | 3/1990 |
| EP | 0663335 A1 | 7/1995 |
| EP | 0857341 A1 | 8/1998 |
| EP | 2088567 B1 | 8/2011 |
| EP | 3267216 A1 | 1/2018 |
| FR | 2651059 A1 | 2/1991 |
| FR | 2881837 A1 | 8/2006 |
| GB | 2537019 A | 10/2016 |
| JP | H05278680 A | 10/1993 |
| JP | H09304506 A | 11/1997 |
| JP | 2003231494 A | 8/2003 |
| WO | 9846479 A1 | 10/1998 |
| WO | 03018398 A1 | 3/2003 |
| WO | 2005025984 A1 | 3/2005 |
| WO | 2010092199 A1 | 8/2010 |
| WO | 2012007618 A1 | 1/2012 |
| WO | 2015055794 A1 | 4/2015 |
| WO | 2016145543 A1 | 9/2016 |
| WO | 2018087509 A1 | 5/2018 |
| WO | 2018140549 A1 | 8/2018 |

* cited by examiner

SYSTEM AND METHOD FOR MONITORING A SPATIAL POSITION OF A MOBILE TRANSMITTER, MAN-OVER-BOARD DETECTION SYSTEM

TECHNICAL FIELD

The present invention relates to a system and a method for monitoring a spatial position of a mobile transmitter. The present invention further relates to a man-over-board detection system.

BACKGROUND

Although applicable in principle to any system for detecting a spatial position of an object, the present invention and its underlying problem will be hereinafter described in conjunction with detecting a man-over-board event on a vessel.

A man-over-board event is an event of a person falling from some height into the water. There are many elements which make the man-over-board events dangerous. If the air or water temperature is cold, even a relative short exposure can lead to death. Furthermore, man-over-board events may occur, for example at night or in high seas. In such cases, it might be rather difficult to detect the man-over-board event I good time and to start a rescue within a short time.

With increasing time, the chances of survival decrease. It is therefore of great importance to recognize a man-over-board event very quickly to initiate a rescue as soon as possible.

Against this background, a problem addressed by the present invention is to provide a reliable detection of an event when an object of interest leaves an allowable area. In particular, the present invention aims to provide an improved man-over-board detection. The present invention further aims to provide an efficient and weather-independent detection of a man-over-board event.

SUMMARY

The present invention solves this object by a system for monitoring a spatial position of a mobile transmitter, a method for monitoring a spatial position of a mobile transmitter and a man-over-board detection system with the features of the independent claims. Further advantageous embodiments are subject matter of the dependent claims.

According to a first aspect, the present invention provides a system for monitoring a spatial position of a mobile transmitter. The system comprises a number of at least two base stations and a processing unit. Each base station of the number of at least two base stations is configured to receive a radio frequency signal emitted by the mobile transmitter. The processing unit is configured to obtain signal strengths of the radio frequency signal received by the number of the at least two base stations. The processing unit is further configured to compute a spatial position of the mobile transmitter. The spatial position of the mobile transmitter may be computed based on the signal strengths of the received radio frequency signal. The processing unit is further configured to determine whether or not the computed spatial position of the mobile transmitter is outside a predetermined spatial area. Finally, the processing unit is configured to generate an alert indication, if the computed spatial position of the mobile transmitter is outside the predetermined spatial area.

According to a further aspect, a man-over-board detection system is provided. The system comprises a mobile transmitter, a number of at least two base stations and a processing unit.

The mobile transmitter is configured to emit a wireless signal. Further, the mobile transmitter is configured to be attached to a target of interest or to be included in a target of interest. Each of the number of the at least two base stations is arranged on a vessel. Each base station is configured to receive a wireless signal emitted by the mobile transmitter. The processing unit is adapted to obtain signal strengths of the radio frequency signal received by the number of the at least two base stations. The processing unit is further configured to compute a spatial position of the mobile transmitter. The computation of the spatial position may be performed based on the signal strengths of the received radio frequency signal. The processing unit is further configured to determine whether or not the computed spatial position of the mobile transmitter is outside a predetermined spatial area of the vessel. Finally, the processing unit is configured to generate an alert indication if the computed spatial position of the mobile transmitter is outside the predetermined spatial area.

According to still a further aspect, a method for monitoring a spatial position of a mobile transmitter is provided. The method comprises receiving a radio frequency signal emitted by the mobile transmitter. The receiving may be performed separately by each base station of a number of at least two base stations. The method further comprises obtaining signal strengths of the received radio frequency signal. In particular, a separate signal strength is determined for each of the number of at least two base stations. The signal strengths may be determined by a processing unit. In a further step, a spatial position of the mobile transmitter is computed. The computation of the spatial position may be based on the signal strengths of the received radio frequency signal. The method further comprises determining whether or not the computed spatial position of the mobile transmitter is outside a predetermined spatial area. Finally, the method comprises generating an alert indication, if the computed spatial position of the mobile transmitter is outside the predetermined spatial area. The steps of obtaining the signal strengths, computing the spatial position of the mobile transmitter, determining whether or not the computed spatial position of the mobile transmitter is outside the predetermined spatial area and generating the alert indication may be performed by the processing unit.

The present invention is based on the fact that a very fast and reliable detection of a man-over-board event is of great importance for ensuring the survival of the victim. However, monitoring a vessel and detecting man-over-board events by optical systems require huge computational resources. Furthermore, optical systems may be affected by bad weather conditions, such as fog or the like.

It is therefore an idea of the present invention to apply a man-over-board detection based on radio frequency technology. In particular, it is an idea of the present invention to monitor spatial positions of radio frequency transmitters, and to detect an event when a monitored radio frequency transmitter is located outside an allowable spatial area such as the area of a vessel.

By using radio frequency technology for monitoring spatial positions of objects, it is possible to avoid drawbacks of optical systems. For example, radio frequency systems may be influenced due to bad weather conditions like fog, darkness or reflections by unfavorable sun conditions.

Hence, the reliability of man-over-board detections can be improved by analyzing radio frequency signals.

Any kind of appropriate radio frequency transmitter may be used for monitoring the spatial position and detecting man-over-board events. For example, wireless communication devices such as radios, mobiles or the like may be used for monitoring the spatial positions of persons carrying these devices. In particular, each device may be related to a specific, well-known person. Thus, when detecting a man-over-board event by monitoring a related device, it may be possible to immediately identify the respective person.

Furthermore, by monitoring the spatial positions of radio frequency devices used by crew members or other persons on a vessel, the man-over-board detection may be applied by monitoring already existing devices. Thus, no additional devices have to be provided to the persons on a vessel for detecting man-over-board events. Hence, a very reliable and cost-efficient man-over-board detection is achieved.

Each base station of the number of at least two base stations may be a base station of a wireless communication system. For example, the base stations may be base stations of a wireless communication system on a vessel. The communication system of the vessel may be, for example, a communication system such as R&S® NAVICS. However, it is understood, that any other maritime communication system may be also used. Accordingly, each base station may receive a wireless signal from mobile devices, in particular mobile transmitters to be monitored for detecting a man-over-board event. Furthermore, the base station may also transmit wireless signals to mobile devices for establishing mobile communication. However, the processes for modulation and demodulation in order to establish wireless communication between a base station and a mobile device such as the mobile transmitter will be not described in more detail.

For monitoring a spatial position of a mobile transmitter, it may be sufficient to analyze the signal strength of a wireless signal emitted by the mobile transmitter and received by at least two base stations. It is for this purpose that each base station may identify a specific wireless signal related to a desired wireless transmitter. Accordingly, it is possible to determine the signal strength of the wireless signal emitted by the transmitter separately for each base station. For example, it may be possible that the signal strength may be determined by each base station. For this purpose, the base station may comprise appropriate analog or digital components for determining the respective signal strength. Alternatively, it may be also possible that each base station provides the radio frequency signal received from the mobile transmitter to a further device. In this case, the further device may analyze the provided signal in order to determine the respective signal strength. For example, the signal strength of a radio frequency signal may be determined by a power detector or the like. It is understood that the respective device for determining the signal strength may comprise any appropriate elements such as filters, rectifiers, resistors, inductors, capacitors or the like.

The signal strength of the radio frequency signal received by the at least two base stations are provided to a processing unit. The processing unit may analyze the amount of the signal strength and compute a spatial position or at least an estimate of a spatial position of the mobile transmitter based on the signal strength of the wireless signal received from the mobile transmitter by the at least two base stations. For example, the computation of the spatial position may be based on triangulation. However, it is understood, that any other appropriate scheme for determining the spatial position of the mobile transmitter may be also possible. By using a number of more than two base stations for receiving the wireless signal from the mobile transmitter and determining the related signal strength, the accuracy for determining the spatial position of the mobile transmitter may be increased. The processing device may further compare the determined spatial position of the mobile transmitter with a predetermined spatial area. For example, the predetermined spatial area may be an area specifying an area of the vessel. For example, the predetermined spatial area may be related to a map of a vessel. Accordingly, it is possible to determine whether or not the mobile transmitter is located on the vessel or outside the vessel. In case the mobile transmitter is located outside the vessel or any other specific allowable area, an alert indication may be generated. The alert indication may be provided to any appropriate further device for initiating appropriate operations. For example, the alert indication may trigger an alarm, and based on this alarm a rescue operation may be initiated.

The processing unit may comprise, for example, a signal processor for processing the values of the signal strength of the wireless signal received by the at least two base stations. The processing unit may further comprise additional elements like analog to digital converters, filters, attenuators, amplifiers or the like that are necessary for receiving the signals associated with the signals received by the at least two base stations. The processing unit may be implemented as hardware, software or any combination of hardware and software. For example, the processing device may comprise a processor and a memory for storing instructions to cause the processing unit to perform the desired operations. The processor may further execute an operating system that loads and executes the instructions stored in the respective memory. The processor may be, for example, an Intel processor that runs a Windows or Linux operating system that loads and executes the instructions. In another embodiment, the processor may be a processor that runs an embedded operating system that loads and executes the instructions.

Further embodiments of the present invention are subject of the further sub-claims and of the following description referring to the drawings.

In a possible embodiment, the predetermined spatial area is a predetermined two-dimensional or three-dimensional area.

For example, the predetermined spatial area may specify a two-dimensional area defining the area covered by a top view of the vessel or another spatial area which is to be monitored. Accordingly, such a two-dimensional area may specify the outer boarder of the vessel, and consequently, it is possible to determine whether or not the transmitter to be monitored is within the area covered by the vessel or not. Furthermore, it may be also possible to specify a more detailed, three-dimensional area covered by the vessel or another object to be monitored. In this way, the accuracy for determining whether or not the transmitter, and consequently the associated person, is located inside the vessel.

In a possible embodiment, the system for monitoring the spatial position of the mobile transmitter may comprise a map memory for storing the predetermined area.

The predetermined two-dimensional or three-dimensional area may be specified in any appropriate form. For example, it may be possible to define a polygon for defining the predetermined area. For example, the vertexes of the polygon may be defined by two-dimensional or three-dimensional coordinates. However, it is understood, that any other appropriate scheme for specifying the predetermined two-dimensional or three-dimensional area may be also possible.

In a possible embodiment, the number of at least two base stations are located on a vessel. Furthermore, the predetermined spatial area may correspond to a surface of the vessel.

In particular, the base stations may be base stations of a communication system of the vessel. As already described above, any appropriate wireless communication system using multiple base stations may be possible.

In a possible embodiment, the system comprises an alert indication unit. The alert indication unit may be configured to receive the alert indication from the processing unit. The alert indication unit may further generate an alert signal upon receiving the alert indication from the processing unit.

For example, the alert indication unit may generate an optical and/or acoustical alert. Additionally, or alternatively, it may be possible to generate any other appropriate signal, for example a signal for an automated initialization of a rescue operation.

In a possible embodiment, the processing unit may be configured to compute a speed or an acceleration of the mobile transmitter. The processing unit may be further configured to generate an alarm indication, if the computed speed and/or the acceleration of the mobile transmitter exceeds a predetermined threshold value.

If an object of interest leaves an allowable area, e.g. a person is falling over board, the person may fall towards the water with increasing speed. Accordingly, by monitoring the speed and/or the acceleration of the mobile transmitter associated with such a person, it may be possible to identify the speed or acceleration which goes beyond the normal speed or acceleration of a human being. This may be also considered as an early indication for a man-over-board event.

In a possible embodiment, the processing unit is configured to compute the speed or the acceleration of the mobile transmitter in a vertical direction.

Usually, persons on a vessel mainly move in horizontal direction. If a person is moving in vertical direction with high speed or high acceleration, this also may be an indication of a man-over-board event.

Furthermore, the analysis of the speed or the acceleration of the mobile transmitter may be considered in combination with the determined spatial position of the mobile transmitter. In particular, a high speed or acceleration may be considered as an indication for a man-over-board event in case the spatial position of the mobile transmitter is close to a border of the predetermined spatial area. Since the determination of the spatial position based on the signal strengths of the radio frequency signals emitted by the mobile transmitter may have only limited precision, the man-over-board event may be detected even earlier and with high accuracy by additionally taking into account the speed or acceleration of the mobile transmitter.

In a possible embodiment, the processing unit may be further configured to compute a direction of movement of the mobile transmitter. In particular, the direction of movement of the mobile transmitter may be computed after determining that the mobile transmitter is outside the predetermined spatial area.

By computing the direction of movement of the mobile transmitter after detecting that the mobile transmitter is outside the predetermined spatial area, i.e. when detecting a man-over-board event, the direction of movement may be used as a helpful indication for quickly detecting the person with the associated mobile transmitter. Accordingly, the success of a rescue operation is increased.

In a possible embodiment, at least one of the number of at least two base stations is configured to establish a wireless data communication with the mobile transmitter.

As already mentioned above, same base stations may be used for performing communication between a base station and the mobile transmitter and for determining the spatial position of the mobile transmitter. Accordingly, no additional base stations are required for monitoring the spatial position of the mobile transmitter, and for detecting events such as a man-over-board event.

In a possible embodiment, the wireless data communication may be performed according to a wireless local area network standard. In particular, the wireless data communication may be performed according to IEEE 802.11 standard. However, it is understood, that any other wireless communication standard may be also used. Accordingly, for determining the spatial position of a wireless transmitter, the wireless signals emitted for the wireless communication may be analyzed. For example, beacon signals or any other radio frequency signal may be used for monitoring the spatial position of a wireless transmitter.

In a possible embodiment, the processing unit is configured to determine a battery status of the mobile transmitter. By monitoring the battery status of the mobile transmitter, it may be possible to detect an event when no further wireless signals may be emitted due to a loss of energy. Thus, such a loss of energy may be taken into account when detecting a man-over-board event or the like. Furthermore, it may be possible that a signal strength of wireless signals emitted by a wireless transmitter may also depend on a state of charge of a battery or any other battery parameter.

In a possible embodiment, the processing unit is configured to generate an alert message, if the determined battery status has a predetermined value and no radio frequency signal is received from the mobile transmitter by the number of at least two base stations.

If it is detected that the mobile transmitter has a good battery status and consequently, the mobile device shall emit wireless signals but no wireless signals are received, this may also be an indication for an abnormal event. For example, a person carrying the mobile transmitter may fall into water due to a man-over-board event, and subsequently, the wireless transmitter may stop transmitting due to a short circuit or the like. In another example, no further wireless signals may be received, since the distance between the base stations and the wireless transmitter has rapidly increased due to an abnormal event.

In a possible embodiment, the system comprises at least one mobile transmitter. The mobile transmitter may be configured to emit a radio frequency signal. The mobile transmitter may be further configured to be attached to a target of interest or included in a target of interest. For example, the mobile transmitter may be attached to a person, for example a crew member of a vessel. The mobile transmitter may be securely fixed to a person or wearable equipment of the person. Alternatively, the mobile transmitter may be securely included in a wearable equipment. As already mentioned above, the mobile transmitter may be a transmitter of a mobile communication device. However, it is understood that the mobile transmitter may be also a separate device for monitoring the spatial position of an object of interest without any additional functionality.

In a possible embodiment, the mobile transmitter may comprise an emergency transmitter. In particular, the mobile transmitter may comprise a global maritime distress and safety system (GMDSS) transmitter. The mobile transmitter may be further configured to activate the emergency transmitter, in particular the GMDSS transmitter, if signal levels of the number of the at least two base stations fall below a predetermined signal level.

In this way, the mobile transmitter may automatically initiate an emergency signal transmission upon it is detected that the wireless transmitter is outside a range of the base stations.

The present invention therefore provides a very reliable and efficient monitoring of spatial positions of a mobile transmitter. Thus, it is possible to monitor objects of interest, in particular people such as crew members of a vessel. Accordingly, abnormal events such as a man-over-board event can be quickly detected by analyzing the spatial position based on signal strengths emitted by a mobile transmitter.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings in which.

Figure 1:
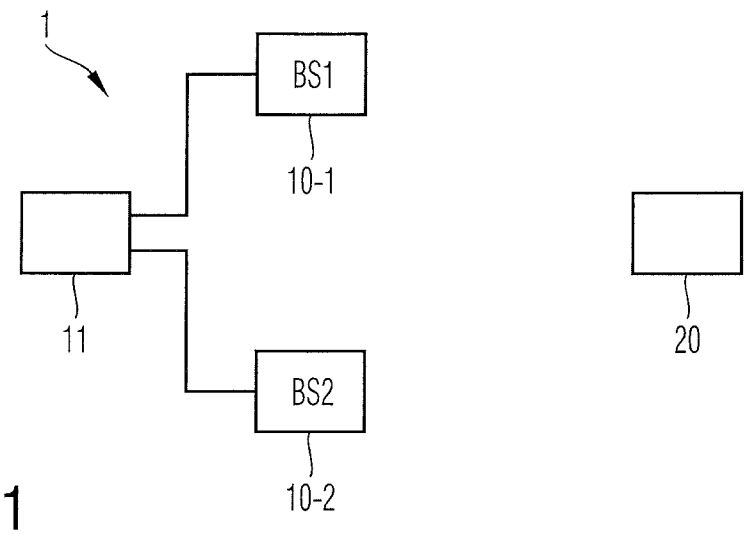
FIG. 1: shows a block diagram of an embodiment of a system according to the present invention.

The appended drawings are intended to provide further understanding of the embodiments of the invention. They illustrate embodiments and, in conjunction with the drawings help to explain principles and concepts of the invention. Other embodiments and many of the advantages mentioned become apparent in view of the drawings. The elements in the drawings are not necessarily shown in scale.

In the drawings same, functionally equivalent and identical elements, features and components are provided with same reference signs in each case, unless stated otherwise.

DETAILED DESCRIPTION OF THE DRAWINGS

FIG. 1 shows a block diagram of an embodiment of a system 1 for monitoring a spatial position of a mobile transmitter 20. The system comprises a number of at least two base stations 10-$i$. Even though only two base stations 10-$i$ are illustrated in FIG. 1, it is understood that the present invention is not limited to only two base stations. Moreover, any number of two or more base stations 10-$i$ are also possible. Each base station 10-$i$ receives a radio frequency signal emitted by transmitter 20. The wireless signal 20 may be any kind of wireless signal. For example, the wireless signal emitted by transmitter 20 may be a radio frequency signal used for a wireless communication, in particular a wireless communication with one of the number of base stations 10-$i$.

For each base station 10-$i$, the signal strength of the received radio frequency signal emitted by the transmitter 20 is determined. Depending on the distance between the mobile transmitter 20 and the individual spatial positions of the base stations 10-$i$, the signal strength of the received radio frequency signal may be different for each base station 10-$i$. Accordingly, it may be possible to determine the distance between the mobile transmitter 20 and the respective base station 10-$i$. This will be described in more detail below.

In a complex radio frequency environment, each base station 10-$i$ has to extract the radio frequency signal emitted by the mobile transmitter 20 from multiple radio frequency signals which are available at the position of the respective base station 10-$i$. After extracting the radio frequency signal of the mobile transmitter 20, the signal strength of the radio frequency signal from the mobile transmitter 20 at the position of the respective base station 10-$i$ is determined. For example, the signal strength may be determined inside the base station 10-$i$. For example, an already existing device for measuring the signal strength inside the base station 10-$i$ may be used for determining the value of the signal strength. Alternatively, it may be also possible to provide the received radio frequency signal from the base station 10-$i$ to a further, external device for measuring the signal strength of the received radio frequency signal. However, it is understood that any other approach for determining the signal strength of the radio frequency signal from the transmitter 20 at the position of the base station 10-$i$ may be also possible. For example, a power sensor may be used for determining the signal strength. However, it may be also possible to use any other kind of device for measuring the signal strength. The signal strength may be determined in an analog or a digital domain. In case the signal strength is determined in an analog domain, it may be further possible to convert the analog measured signal strength in a digital signal by an analog to digital converter.

Based on the signal strength from at least two base stations 10-I, it is possible to compute a spatial position of the mobile transmitter 20. It is understood that by using more than two base stations 10-I and determining the signal strength at the position of more than two base stations 10-$i$, the accuracy for determining the spatial position of the mobile transmitter 20 can be increased.

The values of the signal strength of the radio frequency signals received by the at least two base stations 10-$i$ are provided to processing device 11. Processing device 11 analyzes the values of the signal strength and computes the spatial position of the mobile transmitter 20 based on the values of the signal strength at the positions of the base stations 10-$i$.

After processing unit 11 has computed the spatial position of the mobile transmitter 20, the computed spatial position is compared with a specific predetermined area. The predetermined area may be, for example, an area specifying allowable, secure or at least possible positions for the mobile transmitter 20. Accordingly, if the mobile transmitter 20 is attached to an object of interest, for example a person such as a crew member of a vessel, it is possible to determine whether or not the respective object of interest is located at an allowable position. For example, the allowable position may be the area of a vessel. Accordingly, if the object of interest is outside the allowable area, for example the area of the vessel, it may be detected that the object of interest is located at an unusual position. For example, a person carrying the mobile transmitter 20 may be located outside the vessel. In this case, if the person with the mobile transmitter 20 is outside the vessel, a man-over-board event has occurred. By detecting that the mobile transmitter 20 is outside the allowable area, for example outside the vessel, processing unit 11 may identify such an abnormal situation and generate an alert indication.

Thus, the alert indication may be automatically generated based on the analysis of the signal strength from the mobile transmitter 20 at the positions of the base stations 10-*i*.

The data for specifying the specific predetermined area may be provided, for example, in form of map data or the like. For example, the data for specifying the predetermined area may be stored in an appropriate memory (not shown in FIG. 1) which is communicatively coupled to processing unit 11. The data for specifying the predetermined area may be provided, for example, by edges of a polygon. The predetermined area may specify, for example, a two-dimensional area, for example in a horizontal plane. For example, the predetermined area may be an area of top view of a vessel. However, it may be also possible to specify a three-dimensional space. Accordingly, processing unit 11 may determine whether or not the mobile transmitter 20 is located inside such a predetermined three-dimensional space.

Figure 2:
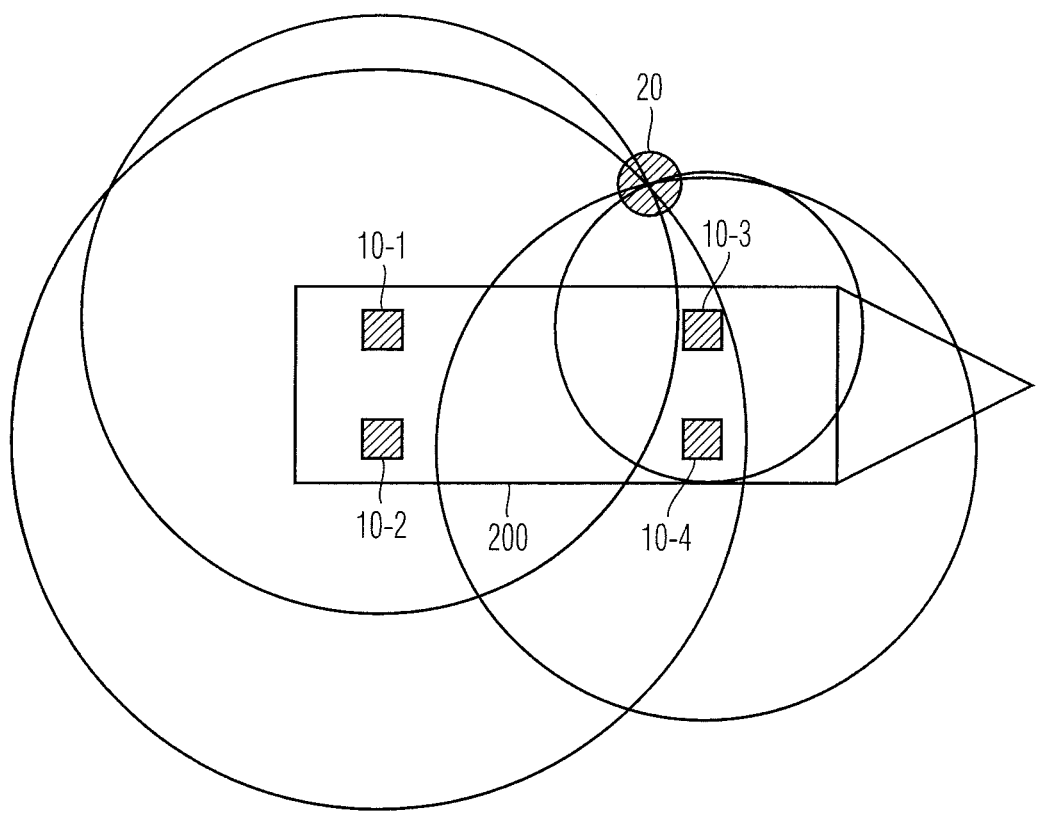
FIG. 2: shows a schematic diagram illustrating determining a spatial position of a transmitter according to an embodiment of the present invention.

FIG. 2 shows a schematic diagram illustrating a scheme for determining a spatial position of a transmitter 20 based on the signal strength at the position of multiple base stations 10-*i*. For example, four base stations 10-1 to 10-4 may be located on a vessel 100. The mobile transmitter 20 may transmit a radio frequency signal. The transmitted radio frequency signal may be received by the base stations 10-*i*. Depending on the distance between the mobile transmitter 20 and the individual base stations 10-*i*, the signal strengths at the positions of the base stations 10-*i* may vary. Accordingly, by analyzing the signal strengths of the received radio frequency signal, it may be possible to determine a circle or a surface of sphere on which the mobile transmitter 20 is located. Accordingly, processing device 11 may compute the spatial position of transmitter 20 to be the intersection point of the circles or spherical surfaces.

Figure 3:
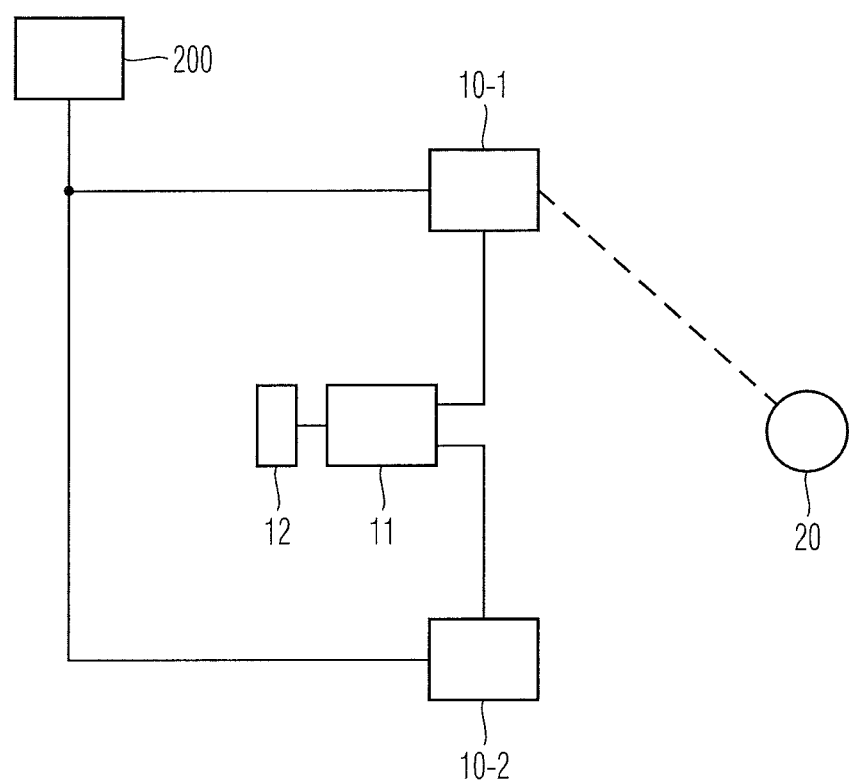
FIG. 3: shows a block diagram of another embodiment of a system according to the present invention.

FIG. 3 shows a further block diagram of a system for monitoring a spatial position of a mobile transmitter 20 according to an embodiment. The embodiment of FIG. 3 mainly corresponds to the previously described embodiment according to FIG. 1. Thus, the explanation in conjunction with FIG. 1 also applies to the embodiment of FIG. 3. As can be further seen in FIG. 3, base stations 10-*i* may be base stations of a communication network. Accordingly, at least one base station 10-1 may be connected to further devices 200 of the communication network. Hence, mobile transmitter 20 may establish a wireless communication link to the communication network 200 via base station 10-1. Accordingly, it is understood that mobile transmitter 20 may not only transmit radio frequency signals, but may also receive radio frequency signals emitted by base station 10-1. However, it is understood that any other base station 10-*i* may be also used for establishing a wireless communication with mobile transmitter 20. Hence, the radio frequency signals received by base stations 10-*i* may be radio frequency signals carrying data. For example, the wireless communication between the mobile transmitter 20 and the base stations 10-*i* may be performed by a wireless local area network, for example a wireless network using a communication via IEEE 802.11 standard. However, it is understood that any other wireless communication standard or proprietary protocol may be also used.

Processing unit 11 may not only compute a static spatial position of mobile transmitter 20, but further determine a speed or an acceleration of mobile transmitter 20. For example, the speed or acceleration of the mobile transmitter 20 may be computed by comparing the spatial positions over time. Based on the speed or the acceleration which has been computed by processing unit 11, the accuracy for an abnormal event, for example a man-over-board event, can be further improved. For example, when an object of interest with the mobile transmitter 20 leaves the allowable predetermined area, the object of interest may be located somewhere which moves relative to the predetermined area. For example, if a crew member of a vessel is falling over board, the vessel may move relative to the crew member with the wireless transmitter. This relative movement may be also used for identifying an abnormal event and for initiating an alert indication. Furthermore, it may be possible that an object of interest, for example a crew member with the wireless transmitter may fall over board and consequently, the crew member is falling with an increasing speed towards ground or sea. This acceleration may be also used as an indication for a man-over-board event or another abnormal event. In particular, in case of a man-over-board event, the crew member of the vessel may fall in vertical direction. Accordingly, processing unit 11 may analyze a vertical movement, in particular a vertical acceleration in order to detect an abnormal event, such as a man-over-board event.

Upon detecting such an abnormal event, for example a man-over-board event, or another event which is detected, for example upon the wireless transmitter 20 is leaving the predetermined area, an alert indication may be generated. This alert indication may initiate, for example an optical or acoustical alert signal. For example, an alert indication unit 12 may be coupled to processing unit 11, and processing unit 11 may forward the alert indication to alert indication unit 12 for outputting an optical or acoustical signal. Additionally, or alternatively, the alert indication may be also used for initiating a rescue operation. For example, a rescue signal may be emitted.

Since the mobile transmitter 20 is a mobile device, e.g. a portable communication device, the mobile transmitter 20 may be powered by a battery. Accordingly, the battery status of the battery powering the mobile transmitter 20 may be further taken into account. For example, the battery status may be periodically transmitted. For example, information regarding the battery status may be included in the radio frequency signal emitted by the mobile transmitter 20. Thus, if it is detected that the battery status of the mobile transmitter 20 is very low, it may be possible that the transmission of radio frequency signals by the wireless transmitter 20 may stop. However, if the battery status of the battery in the mobile transmitter 20 is good, for example the battery status such as the state of charge, is above a predetermined threshold value, no interruption in the transmission of wireless signals is to be expected. If, in such a case when the battery status of the mobile transmitter 20 is above a predetermined threshold, no further radio frequency signals are received by the base stations 10-*i*, this might also be an indication of an abnormal situation. For example, the mobile transmitter 20 and the corresponding target of interest, for example a crew member of the vessel, may fall in water which causes a short circuit of the mobile transmitter 20. Consequently, if a good battery status above a predetermined threshold value is received previously, and subsequently within a specific period of time, no further radio frequency signals are received by all of the base stations 10-*i*, processing unit 11 may also generate an alert indication.

Mobile transmitter 20 may further comprise an emergency transmitter, for example a transmitter of a global maritime distress and safety system (GMDSS). Accordingly, mobile transmitter 20 may also monitor the signal strengths of signals provided by the at least two base stations 10-*i*. If the signal levels of all base stations 10-*i* fall below a predetermined signal level, this may also be an indication that an abnormal situation has occurred. For example, a crew member of a vessel, has fallen over board. Accordingly, upon detecting that the signal strength from the base stations falls below a predetermined signal level, mobile transmitter 20 may activate the emergency transmitter, for example the GMDSS transmitter.

Furthermore, it may be also possible that the mobile transmitter 20 may determine signal levels of the signal provided by the base stations. In this case, mobile transmitter 20 may indicate the determined signal levels of the base stations to at least one of the base stations. Accordingly, this information may be further taken into account for controlling and configuring the operation of the base stations.

Figure 4:
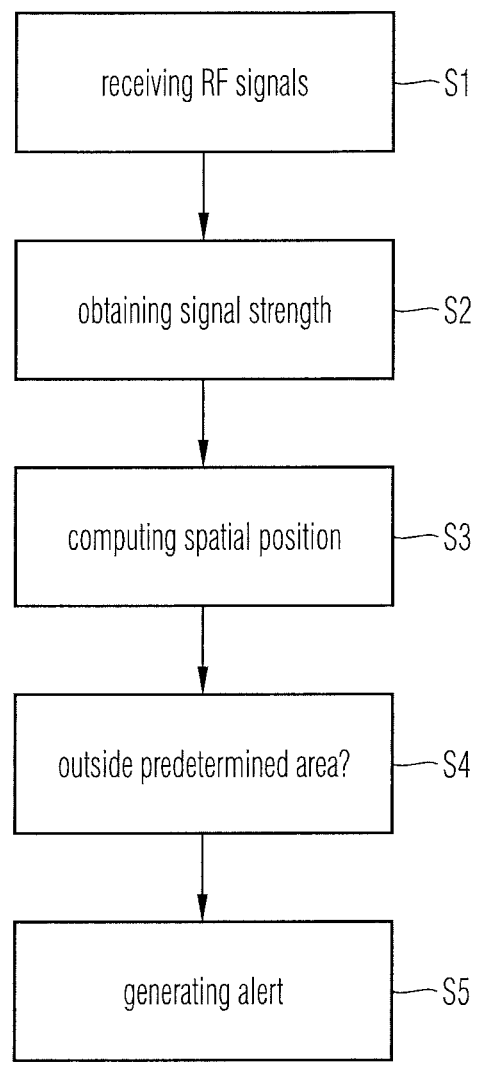
FIG. 4: shows a flow diagram of an embodiment of a method according to the present invention.

FIG. 4 shows a flow diagram of a method for monitoring a spatial position of a mobile transmitter. The method may comprise any appropriate step for performing an operation as described above in connection with the system. Furthermore, the above described system may be configured to perform any appropriate operation as described below in conjunction with the method.

The method comprises a step S1 of receiving radio frequency signals by each base station of a number of at least two base stations. The received signals may be emitted by a mobile transmitter 20. The method further comprises a step S2 of obtaining signal strengths of each radio frequency signal received by the number of the at least two base stations 10-*i*. In a step S3, a spatial position of the mobile transmitter 20 is computed based on the signal strengths of the received radio frequency signals. In a step S4, it is determined whether or not the computed spatial position of the mobile transmitter is outside a predetermined spatial area. In a step S5, an alert indication is generated, if the computed spatial position of the mobile transmitter 20 is outside the predetermined spatial area. The steps S2 to S5 may be performed by a processing unit 11.

The predetermined spatial area may be a predetermined two-dimensional or three-dimensional area. In particular, the predetermined spatial area may be an area specifying an area of a vessel.

The method may comprise generating an alert signal, e.g. an optical or acoustical alarm signal, upon the alert indication has been generated.

The number of at least two base stations may be located on a vessel.

The method may further comprise computing a speed or an acceleration of the mobile transmitter. The alert indication may be generated, if the computed speed or the computed acceleration of the mobile transmitter exceeds a predetermined threshold value. In particular, the speed or the acceleration in a vertical direction may be taken into account.

The method may further comprise computing a direction of movement of the mobile transmitter after determining that the mobile transmitter is outside the predetermined spatial area.

At least one of the base stations may be configured to establish a wireless data communication with the mobile transmitter. In particular, the wireless communication may be performed according to a wireless local area network standard, in particular IEEE 802.11.

The method may further comprise determining a battery status of the mobile transmitter. An alert message may be generated if the battery status is at least at a predetermined value and no radio frequency signal is received form the mobile transmitter by the number of the at least two base stations.

The mobile transmitter may be a mobile transmitter for emitting wireless signals. In particular, the mobile transmitter may be attached to a target of interest or included at a target of interest. For example, the mobile transmitter may be attached to or included in a wearable element.

The mobile transmitter may comprise an emergency transmitter such as a global maritime distress and safety system transmitter. If the mobile transmitter detects that radio frequency signals from the number of the at least two base stations fall below a predetermined signal level, the emergency transmitter may be activated.

The mobile transmitter may further determine signal levels of the base stations and indicate the determined signal levels to at least one of the number of the at least two base stations.

Summarizing, the present invention relates to monitoring a spatial position of a mobile transmitter. In particular, the mobile transmitter may be attached to or included in an object of interest. By analyzing the signal strengths of radio frequency signals emitted by the transmitter, a spatial position of the mobile transmitter can be determined, and it is possible to detect whether or not the spatial position of the mobile transmitter is outside an allowable area. By applying the monitoring of the spatial position to a radio frequency system on a vessel, a reliable man-over-board detection can be achieved.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon re-viewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not in-tended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

What is claimed:

1. A system for monitoring a spatial position of a mobile transmitter, the system comprising:
    a number of at least two base stations for receiving at each base station a radio frequency signal emitted by the mobile transmitter,
    wherein at least one of the number of the at least two base stations is configured to establish a wireless data communication with the mobile transmitter and the at least one base station is connected to a further device of a communication network, and
    wherein the mobile transmitter is configured to establish a wireless communication link to the further device of the communication network via the at least one base station; and
    a processing unit for obtaining signal strength of the radio frequency signal received by the number of the at least two base stations, computing a spatial position of the mobile transmitter based on the signal strengths of the received radio frequency signals, determining whether or not the computed spatial position of the mobile transmitter is outside a predetermined spatial area, and generating an alert indication if the computed spatial position of the mobile transmitter is outside the predetermined spatial area,
    wherein the signal strength of the radio frequency signals obtained by the processing unit comprise a signal strength of the at least one base station which is connected to a further device of a communication network.

2. The system of claim 1, wherein the predetermined spatial area is a predetermined two-dimensional or three-dimensional area.

3. The system of claim 1, wherein the number of at least two base stations are located on a vessel, and the predetermined spatial area corresponds to a surface of the vessel.

4. The system of claim 1, comprising an alert indication unit for receiving the alert indication from the processing unit and generating an alert signal upon receiving the alert indication from the processing unit.

5. The system of claim 1, wherein the processing unit is configured to compute a speed or an acceleration of the mobile transmitter, and wherein the processing unit is further configured to generate the alarm indication, if the computed speed or the acceleration of the mobile transmitter exceeds a predetermined threshold value.

6. The system of claim 5, wherein the processing unit is configured to compute the speed or the acceleration of the mobile transmitter in a vertical direction.

7. The system of claim 1, wherein the processing unit is configured to compute a direction of movement of the mobile transmitter after determining that the mobile transmitter is outside the predetermined spatial area.

8. The system of claim 1, wherein the wireless data communication is performed according to a wireless local area network standard, in particular IEEE 802.11.

9. The system of claim 1, wherein the processing unit is configured to determine a battery status of the mobile transmitter.

10. The system of claim 9, wherein the processing unit is configured to generate an alert message, if the determined battery status is a predetermined value and no radio frequency signal is received from the mobile transmitter by the number of at least two base stations.

11. The system of claim 1, including the mobile transmitter for emitting a wireless signal, the mobile transmitter is configured to be attached to or included in a target of interest.

12. The system of claim 11, wherein the mobile transmitter comprises an emergency transmitter, in particular a global maritime distress and safety system transmitter, and the mobile transmitter is configured to activate the emergency transmitter, if signal levels of the number of the at least two base stations fall below a predetermined signal level.

13. The system of claim 11, wherein the mobile transmitter is configured to determine signal levels of base stations, and to indicate the determined signal levels to at least one of the number of at least two base stations.

14. A man-over-board detection system, the system comprising:
    a mobile transmitter for emitting a wireless signal, the mobile transmitter is configured to be attached to or included in a target of interest;
    a number of at least two base stations arranged on a vessel, each base station is configured to receive a radio frequency signal emitted by the mobile transmitter,
    wherein at least one of the number of the at least two base stations is configured to establish a wireless data communication with the mobile transmitter and the at least one base station is connected to a further device of a communication network, and
    wherein the mobile transmitter is configured to establish a wireless communication link to the further device of the communication network via the at least one base station; and
    a processing unit for obtaining signal strengths of the radio frequency signal received by the number of the at least two base stations, computing a spatial position of the mobile transmitter based on the signal strengths of the received radio frequency signals, determining whether or not the computed spatial position of the mobile transmitter is outside a predetermined spatial area of the vessel, and generating an alert indication if the computed spatial position of the mobile transmitter is outside the predetermined spatial area,
    wherein the signal strength of the radio frequency signals obtained by the processing unit comprise a signal strength of the at least one base station which is connected to a further device of a communication network.

15. A method for monitoring a spatial position of a mobile transmitter, the method comprising:
    receiving, by each of a number of at least two base stations, a radio frequency signal emitted by the mobile transmitter,
    wherein at least one of the number of the at least two base stations is configured to establish a wireless data communication with the mobile transmitter and the at least one base station is connected to a further device of a communication network, and
    wherein the mobile transmitter is configured to establish a wireless communication link to the further device of the communication network via the at least one base station;

obtaining, by a processing unit, signal strengths of each radio frequency signal received by the number of at least two base stations, wherein the obtained signal strengths comprise a signal strength of the at least one base station which is connected to a further device of a communication network, computing, by the processing unit, a spatial position of the mobile transmitter based on the signal strengths of the received radio frequency signal, determining, by the processing unit, whether or not the computed spatial position of the mobile transmitter is outside a predetermined spatial area, and generating, by the processing unit, an alert indication if the computed spatial position of the mobile transmitter is outside the predetermined spatial area.

16. The method of claim 15, wherein the predetermined spatial area is a predetermined two-dimensional or three-dimensional area.

17. The method of claim 15, wherein the number of at least two base stations are located on a vessel, and the predetermined spatial area corresponds to a surface of the vessel.

18. The method of claim 15, comprising receiving the alert indication and generating an alert signal upon receiving the alert indication from the processing unit.

19. The method of claim 15, comprising computing a speed or an acceleration of the mobile transmitter, and generating the alarm indication, if the computed speed or the acceleration of the mobile transmitter exceeds a predetermined threshold value.

20. The method of claim 19, the speed or the acceleration of the mobile transmitter is computed in a vertical direction.

21. The method of claim 15, comprising computing a direction of movement of the mobile transmitter after determining that the mobile transmitter is outside the predetermined spatial area.

22. The method of claim 15, wherein the wireless data communication is performed according to a wireless local area network standard, in particular IEEE 802.11.

23. The method of claim 15, comprising determining a battery status of the mobile transmitter.

24. The method of claim 23, wherein an alert message is generated, if the determined battery status is a predetermined value and no radio frequency signal is received from the mobile transmitter by the number of at least two base stations.

25. The method of claim 15, comprising emitting a wireless signal by the mobile transmitter attached to or included in a target of interest.

26. The method of claim 25, comprising activating an emergency transmitter, in particular a global maritime distress and safety system transmitter, if signal levels of the number of the at least two base stations, fall below a predetermined signal level.

27. The method of claim 25, comprising determining signal levels of base stations, and indicating the determined signal levels to at least one of the number of at least two base stations.

* * * * *